United States Patent Office 2,946,518
Patented July 26, 1960

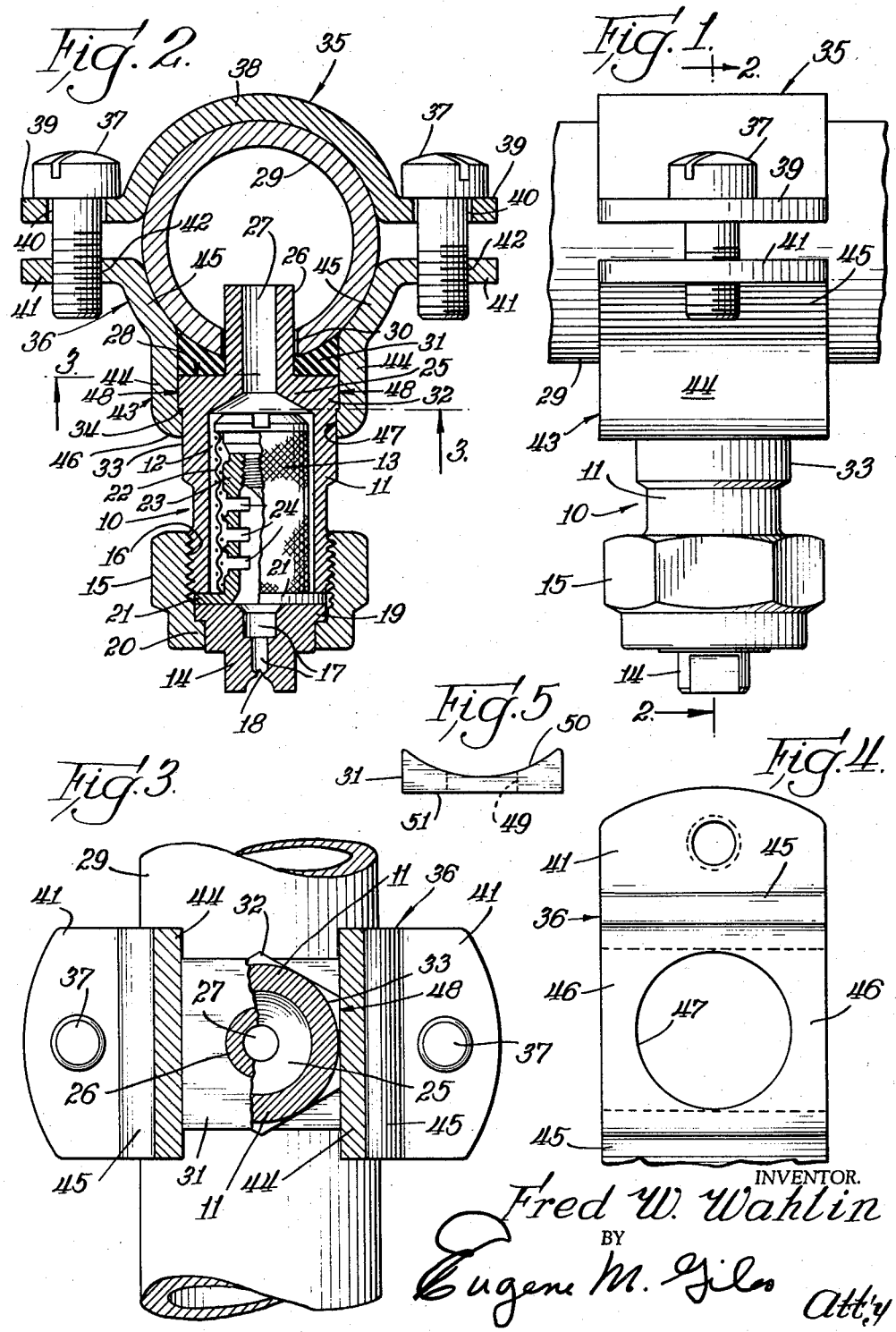

2,946,518

PIPE SIDE SPRAY NOZZLE AND CLAMP

Fred W. Wahlin, Kane County, Ill., assignor to Spraying Systems Co., Bellwood, Ill., a corporation of Illinois Filed Oct. 29, 1957, Ser. No. 693,061

4 Claims. (Cl. 239—266)

This invention relates to spray nozzles of the type adapted to be clamped onto a pipe in sealed engagement therewith around a hole in the pipe side wall through which liquid is suppliable to the nozzle for discharge through the spray orifice of the nozzle, the invention having reference more particularly to the facilities by which the nozzle is attached to the pipe.

In many spraying operations, as for example in field spraying, wherein spray is to be distributed across a wide expanse, it is desirable to attach nozzles at intervals along a pipe for uniform distribution of spray throughout such length of pipe to provide a wide range of coverage, and the pipe serves the dual purpose of supporting the nozzles and also supplying the liquid to the nozzles for the spraying operation.

Nozzles are commonly made in a standardized form, suitable for a variety of spraying operations, oftentimes with a chamber therein to accommodate a strainer, and with removable nozzle tip for replacement thereof when the nozzle orifice is damaged or worn or for interchangeability with nozzle tips of other spray orifice shapes or sizes, and it is highly desirable that such standardized form of nozzle may be employed for the spraying operations above mentioned.

Inasmuch as such standardized nozzles are usually made with external or internal threaded facilities at the rear end for securement thereof to standard pipe and pipe fittings, they may be utilized for such spraying operations by assembly thereof with short lengths of pipe and interposed pipe fittings to make up any desired total pipe length and interval arrangement of nozzles, but this is a time consuming and expensive job requiring tools which may not be available, and accordingly it is a common practice to employ a long length of pipe with holes bored through the side wall at the intervals required for the spacing of the nozzles from one another, and to utilize nozzles which are clamped onto the pipe at the location of the holes and in sealing engagement with the pipe around the holes so that the clamping engagement supports the nozzles on the pipe and provides sealed communication through the holes from the interior of the pipe to the nozzles.

No facilities have been available heretofore, however, for such clamping application of nozzles of the aforesaid standardized form without major modifications of the nozzle which greatly complicated the construction thereof and greatly increased the cost, and moreover the clamping facilities heretofore employed did not provide universal applicability of the nozzles to different pipe sizes nor such simplicity and convenience of application as is desirable and oftentimes necessary for the users of such nozzles.

In accordance with the present invention these disadvantages of clamping application of such nozzles to a pipe are overcome by a simple change in the form of the nozzle body, which is readily made in the conventional procedure for manufacturers thereof and permits the nozzle to be attached by a simple form of pipe clamp which is readily applicable to the nozzle and to a pipe and insures secure attachment of the nozzle and positive sealing thereof around the pipe opening.

The principal objects of the invention are, to provide improved facilities for clamping a nozzle to a pipe in sealed communication with the interior of the pipe through a hole in the pipe side wall; to permit a standardized form of nozzle to be thus clamped onto a pipe without any major modification of such standardized nozzle; to lock the nozzle to the clamp against turning movement for facilitating application and removal of threaded parts by which the nozzle tips are attached to the nozzle body; to provide a construction wherein the nozzle tip and strainer may be removed and replaced without disturbing the clamping engagement of the nozzle with the pipe; to permit interchangeability of clamps for securing the nozzle to pipes of different sizes; to provide a separable connection of the clamp with the nozzle by which they are maintained in combined relation; to simplify the construction of nozzle clamps; and to provide effective and reliable sealing; these and other objects being accomplished as pointed out more particularly hereinafter and as shown in the accompanying drawing in which:

Fig. 1 is a side view of a nozzle clamped onto a pipe in accordance with the invention;

Fig. 2 is a sectional view of the clamped on nozzle of Fig. 1 taken on the line 2—2 thereof;

Fig. 3 is a cross sectional view, on the line 3—3 of Fig. 2, at the place of interconnection of the nozzle with the clamp;

Fig. 4 is an outer side view, with a portion broken away of the clamp half section to which the nozzle is connected; and Fig. 5 is a view looking at one of the diametrical sides of the gasket employed for sealing engagement of the nozzle with the pipe.

Referring to the drawing, the reference numeral 10 indicates the nozzle as a whole, which is of the aforesaid standardized form comprising a body 11 having a chamber 12 therein to accommodate a strainer 13 through which liquid is suppliable to a nozzle tip 14 which is detachably secured to the outer end of the nozzle body 11 by an internally threaded clamping ring 15 having threaded engagement with external threads 16 on an outer end portion of the nozzle body.

The nozzle tip 14 is provided with a central passage 17 leading to an orifice 18 through which spray is discharged from the nozzle and said nozzle tip is formed with an external shoulder 19 around the base for engagement by an internal shoulder 20 at the outer end of the ring 15 for clamping the nozzle tip onto the outer end of the nozzle body. Thus the nozzle tip not only may be readily replaced when the orifice becomes damaged or worn but is interchangable with other nozzle tips which have orifices of other shapes and sizes so that the nozzle is adaptable for a variety of spraying purposes.

The strainer 13 may be of any desired construction which will permit removability thereof from the chamber 12 for cleaning, or it may be omitted if not required, and preferably has a flange 21 around the outer end which is adapted to seat against the outer end of the nozzle body for clamping thereagainst by the nozzle tip 14 when the latter is clamped onto the nozzle by the ring 15.

In the illustrated construction the strainer comprises a cylindrical screen 22 mounted on a tubular body 23 which is closed at the inner end and open at the outer end and has slots 24 through the side wall affording communication through the screen from the exterior of the screen to the interior of the body 23 and this body is formed with the flange 21 around the outer end thereof.

Nozzles of such standardized form are usually made either with an internal threaded portion at the rear end, as shown for example, in my Patent No. 2,621,078, or with an external threading, as shown in my Patent No. 2,683,626 for threaded securement to standard pipe or pipe fittings and provided with an external hexagonal form at or adjacent the rear end for wrench engagement for effecting such threaded securement and also for holding the nozzle body against turning when the clamping ring 15 is being attached thereto or removed therefrom and in this form are adapted for rapid, economical and accurate production by employing bars of stock of such hexagonal shape and cutting off and forming the nozzle bodies therefrom in machines of screw machine type.

It is an important feature of the present invention that the nozzle bodies for clamping attachment to a pipe may be made in the same rapid, economical and accurate manner and from the same stock as the aforesaid standardized nozzles with usual internal or external threading at the rear end and as thus a simple and convenient form of pipe clamp is usable therewith for clamping thereof onto a pipe in positive sealing engagement therewith.

For such clamping attachment, the nozzle body is formed as shown herein with a wall 25 at the rear end having a relatively small tubular stem 26 projecting centrally therefrom with an inlet passage 27 leading therethrough to the chamber 12, and the wall 25 is formed to provide a flat gasket face 28 around the stem 26 at the rear of the nozzle body.

This stem 26 is adapted to project into a pipe 29 on which the nozzle is mounted through a hole 30 in the side wall of the pipe, as shown in Fig. 2, and is also adapted to accommodate thereon a gasket 31 which is clamped between the gasket seat 28 and the portion of the side wall of the pipe 29 around the pipe opening or hole 30.

Adjacent the rear end face 28, the body has a relatively short portion 32 of hexagonal form beyond which the body 11 is turned down to a cylindrical form at 33 to provide a shoulder 34, and for reasons hereinafter explained, it is important that the threaded portion 16 of the nozzle body be of such size that it will pass through an opening of a size through which the hexagonal portion 32 will not pass.

The hexagonal form of the enlarged portion 32 is not essential as it may be rectangular or any other form to cooperate with the pipe clamp in the manner hereinafter explained, but it is preferably hexagonal to correspond to the hexagonal form of the stock which it is preferred to use in making the nozzle body.

For clamping this nozzle on the pipe a simple two piece clamp is preferably employed comprising two parts 35 and 36 which are applied respectively to the opposite sides of the pipe 29 and clamped thereon by cap screws 37 or by bolts.

Both clamping parts 35 and 36 may be made from suitable lengths of standard bar stock bent into the required shape, the part 35, which will be referred to as the plain half clamp, being bent to provide a substantially semi-circular seat portion 38 of an internal radius corresponding to approximately one half of the outside diameter of the pipe 29 to which it is to be applied and having outwardly projecting opposite end portions 39 with openings 40 therethrough providing ears to receive the cap screws 37.

The other clamping part 36, which will be referred to as the nozzle holding half clamp, is of a form similar to that of the plain half clamp 35 to mate therewith and is provided with ears 41 at the opposite ends with threaded openings 42 in which the threaded ends of the cap screws 37 are engaged, and between the ears 41 this part 36 is partly of a curvature corresponding to that of the substantially semi-circular seat 38 of the plain half clamp 35, but has the central portion thereof offset as indicated at 43 to provide a bridging with spaced apart legs 44 extending outwardly from spaced apart pipe engageable curved portions 45 and spanned at their outer ends by a portion 46 which is provided with an opening 47 therethrough to accommodate the nozzle 10.

This opening 47 is of suitable size to closely encircle the cylindrical portion 33 of the nozzle body, to hold the nozzle in an outwardly projecting position, with the shoulder 34, which is provided by the enlarged hexagonal formation 32, bearing against the inner face of the spanning portion 46 around the opening 47 thereof and the bridge legs 44 are spaced apart a distance corresponding to the distance between opposite flat faces of the hexagonal portion 32 of the nozzle body to receive said hexagonal portion therebetween with two such opposite flat faces 48 paralleling the inner faces of the legs 46 and sufficiently closely confined therebetween to provide in effect a wrench engagement with the hexagonal portion 32 by which the nozzle body is restrained against turning movement in the opening 47.

The spanning portion 46 is spaced at such distance from the location of the clamped pipe 29 to accommodate the hexagonal portion 32 thereunder and to provide a space between the portion 32 and the pipe for the gasket 31 which is of a compressible rubber or rubber like material, preferably of synthetic rubber type, and of such thickness that when the pipe 29 is clamped between the clamping parts 35 and 36, the gasket will be compressed sufficiently between the rear end face 28 of the nozzle body and the pipe 29 to provide positive sealing around the pipe opening 30.

A conventional gasket 31 of uniform thickness and circular form may be employed, and of course has a central opening 49 through which the stem 26 extends, but I have found it preferable to utilize a square gasket, as shown in Fig. 3, which fits between the legs 44 of the bridge portion 43 and has one side thereof concave, as indicated at 50 in Fig. 5 to correspond to the exterior curvature of the pipe 29 and has the other side flat, as indicated at 51 to correspond to the flat face 28 at the rear of the nozzle body.

The nozzle is assembled with the clamp by removing the clamping ring 15 from the nozzle body and inserting the latter with the threaded end 16 foremost through the opening 47 of the nozzle holding half clamp 36, after which the clamping ring 15 is restored on the nozzle body and it is to be noted that when the ring 15 is applied the nozzle becomes a connected part of the assembly so that the parts are combined and are not likely to be misplaced or lost from one another.

Also it is to be noted that when the nozzle body is inserted through the opening 47 with the hexagonal portion 32 of the nozzle body fitted between the legs 44 of the clamp offset, the nozzle body is thereby held against turning movement in the opening 47 so that the clamping ring 15 may be readily applied and removed from the nozzle body and moreover, after the nozzle has been clamped on the pipe 29, the nozzle tip may be removed and replaced and the strainer removed for cleaning without disturbing the clamping engagement of the nozzle with the pipe.

The clamp is readily removable from the nozzle so that the latter may be assembled with similar clamps for pipes of other sizes, and as the nozzle is of the same standardized form, except for the rear end formation thereof, as nozzles commonly used for other spraying purposes, and may be made by the same rapid and economical procedure as nozzles of the standardized form and the clamp is of a particularly simple and economical form, this clamp and nozzle assembly is highly advantageous for side clamping to pipes in sealed communication with the interior of the pipe through a hole in the side wall of the pipe.

Obviously the tubular stem 26 may be a separate tube which is fitted into or attached to the rear end of the nozzle body, or it could be a short length of tubing with the gasket molded thereon or otherwise attached thereto so as to hold the tube in place when the gasket is clamped between the nozzle and the pipe and having projecting ends at opposite sides of the gasket to project respectively into the hole in the pipe and into a hole in the rear end wall 25 of the nozzle. Also the nozzle body may be internally threaded at the outer end instead of externally threaded as shown herein, especially when it is to be used without a strainer, and in such case the nozzle tip may merely be externally threaded and screwed into the internally threaded outer end of the body as is well known in the art.

While I have shown and described my invention in a preferred form, I am aware that various changes and modifications may be made therein without departing from the principles of the invention, the scope of which is to be determined by the appended claims.

What is claimed is:

1. A pipe clamp and spray nozzle assembly wherein the pipe clamp has an outwardly projecting portion of general U-shape with outwardly extending laterally spaced opposite side walls thereof providing the legs of the U and an apertured cross wall which extends between and interconnects the side walls at their outer ends and provides the closed end of the U and has separably attached thereto a nozzle provided at its outer end with removable closure means provided with a spray orifice leading from the interior of the nozzle, the clamp having seats at the opposite sides respectively of the open end of the U between which said seats a pipe with an opening in the side wall thereof is interposable in clamping engagement thereagainst with the pipe side wall opening facing toward said cross wall, the nozzle having a hollow generally cylindrical body which extends through the aperture of the cross wall and projects outwardly therefrom and has an enlargement at each end located respectively at the inner and outer sides of the cross wall and too large to pass through the aperture of the cross wall and serving conjointly to lock the nozzle in said aperture against removal therefrom, the enlargement at the outer end of said body being a part of said closure means and detachably secured on the body and applicable thereon and removable therefrom by turning movement thereof about the longitudinal axis of the body while the body is restrained against turning movement therewith, and the enlargement at the inner end of the body being formed at the periphery with outwardly projecting portions which are slidable along the aforesaid legs of the U in an abutting relation thereagainst which restrains turning movement of the body in the aperture of the cross wall, the said body having at its inner end a tubular stem which projects therefrom in a direction leading between the seats at the opposite sides of the open end of the U and has a sealing gasket therearound which is adapted to be compressed between the enlargement at the inner end of the body and a pipe when the latter is clamped against said seats and provide a sealed path of communication from the interior of the pipe through the tubular stem to the interior of the nozzle.

2. A pipe clamp and spray nozzle assembly as defined in claim 1 in which the enlargement at the inner end of the nozzle body has flat faces at opposite sides thereof facing toward and cooperable with inner side faces respectively of the side walls of the legs of the U to restrain turning movement of the body in the aperture of the cross wall.

3. A pipe clamp and spray nozzle assembly as defined in claim 1 in which the outwardly projecting portion of general U-shape is an intermediate portion of the length of bar stock shaped in the general U-shape and the enlargement at the inner end of the nozzle body is polygonal in cross section providing opposite side faces embraced by the leg portions of the general U-shaped projecting portion to restrain turning movement of the body in the aperture of the cross wall.

4. A pipe clamp and spray nozzle assembly as defined in claim 1 wherein the enlargement at the inner end of the body and the gasket are disposed one above the other and one thereof is provided with a concave face against which the side wall of a pipe is engaged when clamped in the pipe clamp.

References Cited in the file of this patent

UNITED STATES PATENTS

| 1,659,470 | Owen et al. | Feb. 14, 1928 |
| 1,857,831 | Ashworth | May 10, 1932 |
| 2,512,009 | Bober | June 20, 1950 |
| 2,577,714 | Proff | Dec. 4, 1951 |
| 2,681,829 | Wahlin | June 22, 1954 |

FOREIGN PATENTS

| 874,524 | Germany | Apr. 23, 1953 |